2,777,767
SELF-FLUXING SILVER ALLOY FILLER METAL

Theodore I. Leston, New York, N. Y., assignor to Eutectic Welding Alloys Corporation, New York, N. Y., a corporation of New York No Drawing. Application September 10, 1953,
Serial No. 379,473

3 Claims. (Cl. 75—157.5)

This invention relates to a new brazing alloy, and more particularly to a brazing alloy of the type commonly described as German silver. More specifically, the present invention relates to a high silver, nickel brazing alloy which can be applied in various type metal joining operations without the need of an auxiliary or external fluxing agent.

It has long been common practice to formulate various type silver brazing alloys which have a relatively high fluidity during the brazing operation, and which exhibit a near perfect affinity to ferrous materials and alloys. An example of an exceedingly effective brazing alloy is the prior U. S. Patent No. 2,279,284 to Rene D. Wassermann, and in which substantial amounts of silver and nickel are combined with a major proportion of copper and a large amount of zinc. Although this alloy has proven very effective in practice for the purpose intended, it, in common with other contemporary alloys, requires an auxiliary fluxing composition to provide the necessary cleansing and wetting of the base metals desired to be joined. Thus, the inability of such prototype alloys to provide strong, dense joints without an additional fluxing step has rendered many brazing operations extremely expensive, and in fact, has prohibited the application of such joining procedure in many repairing and manufacturing operations.

It is, therefore, a primary purpose of the present invention to obviate such deficiencies and to provide an alloy which can be applied in a metal joining operation and exhibit self-fluxing properties. It is an object of the present invention to provide a brazing alloy containing selected proportionate constituents which, in addition to exhibiting a self-fluxing property, will produce an unusual strength and hardness in the finished joint. It is an object of the invention to provide such type self-fluxing alloy without eliminating the high fluidity of the alloy at the metal joining temperatures or without destroying its affinity for various type ferrous materials. Other and distinct objects will become apparent from the disclosure of the specification and claims which follows.

I have discovered that a unique filler metal may be formed by alloying copper, zinc, nickel, and silver, together with minute amounts of manganese and iron in a relatively limited proportional range of produce a new alloy which can be applied to various ferrous and non-ferrous materials without need for a separate fluxing or precleaning step. In particular, it has been discovered that an alloy formed according to the present invention can be used with unexcelled efficiency as the filler metal in controlled atmosphere, furnace brazing operations in which the alloy performs a self-cleansing and self-fluxing function. Specifically, the alloy is of particular efficacy when used in conventional hydrogen furnace brazing operations.

According to the present invention, the alloy comprises a major proportion of copper, a relatively high or substantial proportion of silver, smaller amounts of zinc and nickel, and minute amounts of manganese and iron.

It will at once be apparent that the constituents of the alloy differ from conventional German silver solders in the absence of silicon and the relatively small proportion of zinc used. It will further be appreciated that the alloy employs substantially greater silver than the known "Kovar" type, non-eutectic, silver-copper soldering alloys, as for example, as described in U. S. Patent 2,330,062. The present alloy is further distinguishable from the single phase (alpha solid solution) copper-nickel-zinc alloys which are designed for specific heat treatable properties, as for example, as described in U. S. Letters Patent 2,101,087.

In particular, the present alloy distinguishes over such known similar type filler metals in that it exhibits high fluidity, exceptional capillary flow, good adherence, no fuming, a complete absence of dezincification and a self-fluxing character.

Tests on the present alloy made in the usual manner according to the standards of the American Society for Testing Materials, gave the following results:

Yield point (pounds per sq. inch)___ approx. 35,000 p. s. i.
Tensile strength (pounds per sq. inch) _____ approx. 43,000 p. s. i.
Elongation in 2 inches _____ 35 percent
Brinell hardness _____ 115 percent From the foregoing, it will be obvious that the present alloy constitutes a type heretofore not realized. Additionally, the alloy exhibits improved corrosion resistance rendering it useful for various joining applications in which the low strengths of contemporary brazing and soldering alloys are found unsuitable.

The following are the ranges of the materials within which the self-fluxing alloy is preferably produced according to the invention.

| | Percent |
|---|---|
| Copper | 53– 56 |
| Zinc | 9– 11 |
| Manganese | 0.05– 0.5 |
| Iron | 0.10– 0.5 |
| Nickel | 6.0– 9.0 |
| Silver | 25.0–28.0 |

It is suggested, however, that even a more limited range be used due to the fact that many commercially available materials are in effect contaminated in amounts up to 1% of foreign components. This preferred range is as follows.

| | Percent |
|---|---|
| Copper | 54– 55 |
| Zinc | 9.5–10.5 |
| Manganese | 0.05–0.1 |
| Iron | 0.10 |
| Nickel | 7.25–8.0 |
| Silver | 26–27 |

The minor amounts of iron and manganese present, while admittedly within the ranges of commercial impurities normally found in the main raw materials used, have been determined to be a critical factor in obtaining the self-fluxing property of the alloy. Apparently, although the precise chemical and/or metallurgical reasoning is not presently fully understood, the iron and manganese, in the absence of silicon, and in the presence of an unusually low proportion of zinc, function as deoxidizing agents to provide a fluxing action not exhibited in similar type alloys having compositions differing radically from the present one. In any event, it is mandatory that the manganese and iron be present in less than 0.50% and that the zinc content be very low.

A particularly effective brazing operation was carried out in a hydrogen brazing furnace by the application of the following brazing alloy in rod form to ferrous materials. The alloy composition was as follows:

| | Percent |
|---|---|
| Cu | 55.03 |
| Zn | 10.15 |
| Mn | 0.09 |
| Fe | 0.10 |
| Ni | 7.76 |
| Ag | 26.75 |

The alloy may be formed by any of the conventional methods of smelting and mixing, but is preferably conducted in an electric furnace in a controlled, reducing atmosphere. The alloy may be molded or extruded in the form of rods, sheets, bars, etc. Alternatively, the alloy may be comminuted to provide a dust or granular mixture which can be brushed on the materials desired to be joined. Further, the alloy is not restricted in its utility to brazing operations, but can also be applied in the joining of steel and other ferrous materials, including cast iron, as well as non-ferrous materials, such as copper, brass, bronze, etc. The joining operation may be a brazing, fusion or arc welding one, and the alloy can be used as a filler metal or as an electrode core rod dependent upon the temperature at which the joining operation must be conducted.

As many apparently widely different embodiments of my invention may be made without departing from the spirit and scope hereof, it is to be understood that my invention is not limited to the specific embodiments hereof except as defined in the appended claims.

What is claimed is:

1. A self-fluxing silver brazing alloy composed of the following materials in the ranges indicated:

| | Percent |
|---|---|
| Copper | 53–56 |
| Zinc | 9–11 |
| Manganese | 0.05–0.5 |
| Iron | 0.10–0.5 |
| Nickel | 6.0–9.0 |
| Silver | 25.0–28.0 |

2. A self-fluxing silver brazing alloy composed of the following materials in the ranges indicated:

| | Percent |
|---|---|
| Copper | 54–55 |
| Zinc | 9.5–10.5 |
| Manganese | 0.05–0.1 |
| Iron | 0.10 |
| Nickel | 7.25–8.0 |
| Silver | 26–27 |

3. A self-fluxing silver brazing alloy having the following composition:

| | Percent |
|---|---|
| Cu | 55.03 |
| Zn | 10.15 |
| Mn | 0.09 |
| Fe | 0.10 |
| Ni | 7.76 |
| Ag | 26.75 |

References Cited in the file of this patent
UNITED STATES PATENTS
2,279,284    Wassermann    Apr. 7, 1942